United States Patent [19]

Kaneko

[11] Patent Number: 4,815,823
[45] Date of Patent: Mar. 28, 1989

[54] ELECTRO-OPTICAL DEVICE WITH PLURAL LOW RESISTIVE PORTIONS ON EACH HIGH RESISTIVE ELECTRODE

[75] Inventor: Shuzo Kaneko, Tokyo, Japan

[73] Assignee: Canon Kabushiki Kaisha, Tokyo, Japan

[21] Appl. No.: 148,753

[22] Filed: Jan. 26, 1988

[30] Foreign Application Priority Data

Jan. 29, 1987 [JP] Japan .................................. 62-17186

[51] Int. Cl.⁴ ............................................... G02F 1/133
[52] U.S. Cl. .................................... 350/336; 350/332; 350/333; 350/350 S; 350/356
[58] Field of Search ............ 350/332, 333, 336, 350 S, 350/355, 356

[56] References Cited

U.S. PATENT DOCUMENTS

| | | |
|---|---|---|
| 3,675,988 | 7/1972 | Soref ...................................... 350/336 |
| 4,297,004 | 10/1981 | Nishimura et al. .................. 350/336 |
| 4,326,776 | 4/1982 | Banda ................................... 350/336 |
| 4,392,718 | 7/1983 | Morrison .............................. 350/336 |
| 4,640,581 | 2/1987 | Nakanowatari et al. ........ 350/336 X |
| 4,641,923 | 2/1987 | Bohmer et al. ................. 350/336 X |
| 4,721,365 | 1/1988 | Nishimura ........................... 350/336 |
| 4,747,671 | 5/1988 | Takahashi et al. ............. 350/336 X |

FOREIGN PATENT DOCUMENTS 0059221  5/1981  Japan ..................................... 350/336

*Primary Examiner*—Stanley D. Miller
*Assistant Examiner*—David Lewis
*Attorney, Agent, or Firm*—Fitzpatrick, Cella, Harper & Scinto

[57] ABSTRACT

An optical modulation device comprises a first substrate having thereon a high-resistivity transparent conductor film and a plurality of low-resistivity conductor films disposed on the transparent conductor film and dividing the transparent conductor film into plural stripes; a second substrate having thereon a plurality of transparent conductor film stripes; and an optical modulation material, such as a ferroelectric liquid crystal, interposed between the first and second substrates. The optical modulation device further includes a plurality of connecting conductors for connecting with an external driver. The connecting conductors are disposed in a region free of the high-resistivity transparent conductor film of the first substrate and each connected to one of the low-resistivity conductor films.

8 Claims, 10 Drawing Sheets

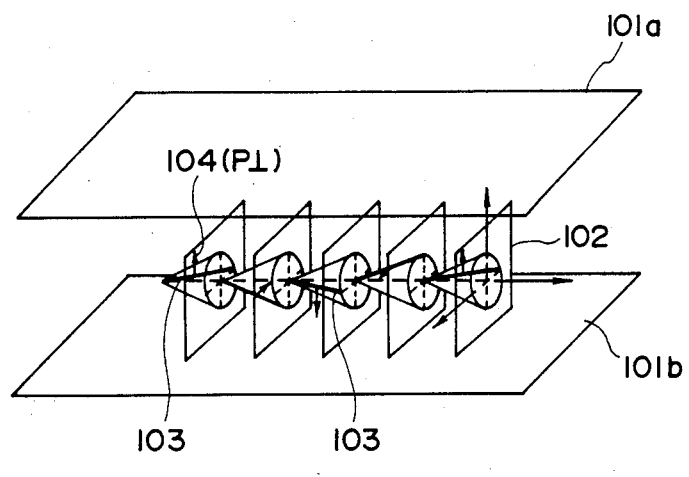
F I G. 15
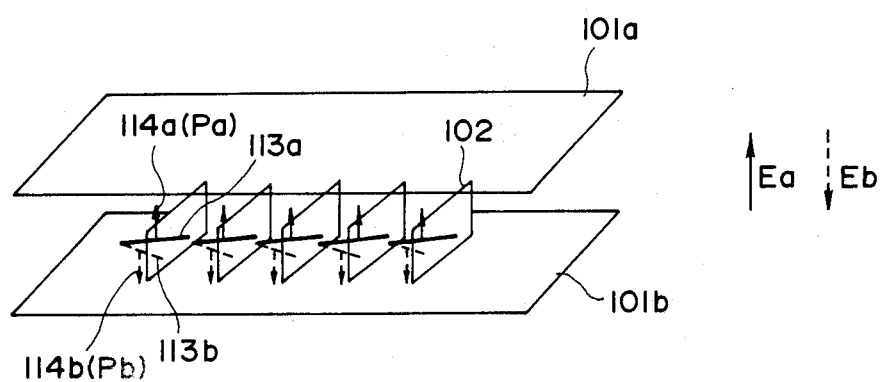
F I G. 16

ELECTRO-OPTICAL DEVICE WITH PLURAL LOW RESISTIVE PORTIONS ON EACH HIGH RESISTIVE ELECTRODE

FIELD OF THE INVENTION AND RELATED ART

The present invention relates to an optical modulation device for a display panel, more particularly to a liquid crystal optical modulation device adapted to gradational or tonal display for a display panel, such as a display, a shutter array, etc., using a ferroelectric liquid crystal.

Hitherto, there is well known a type of liquid crystal device wherein scanning electrodes and signal electrodes are arranged in a matrix, and a liquid crystal compound is filled between the electrodes to form a large number of pixels for displaying images or information. As a method for driving such a display device, a time-division or multiplex driving system wherein an address signal is sequentially and periodically applied to the scanning electrodes selectively while prescribed signals are selectively applied to the signal electrodes in a parallel manner in phase with the address signal, has been adopted.

Most of liquid crystals which have been put into commercial use as such display devices are TN (twisted nematic) type liquid crystals, as described in "Voltage-Dependent Optical Activity of a Twisted Nematic Liquid Crystal" by M. Schadt and W. Helfrich, Applied Physics Letters, Vol. 18, No. 4 (Feb. 15, 1971) pp. 127–128.

In recent years, as an improvement on such conventional liquid crystal devices, the use of a liquid crystal device showing bistability has been proposed by Clark and Lagerwall in Japanese Laid-Open Patent Application No. 107216/1981, U.S. Pat. No. 4,367,924, etc. As bistable liquid crystals, ferroelectric liquid crystals showing chiral smectic C phase (SmC*) or H phase (SmH*) are generally used. These liquid crystal materials have bistability, i.e., a property of assuming either a first stable state or a second stable state and retaining the resultant state when the electric field is not applied, and has a high response speed in response to a change in electric field, so that they are expected to be widely used in the field of a high speed and memory type display apparatus, etc.

However, this bistable liquid crystal device may still involve a problem that the switching between the first and second stable states is so fast that it is difficult to control an intermediate level between the two stable states. For this reason, it has been difficult to display an intermediate gradation. In view of the above, our research group has already proposed a novel optical modulation device solving the above problems by using an optical modulation material having a memory characteristic such as a ferroelectric liquid crystal as described above (U.S. patent applications Ser. Nos. 931,082 and 934,920).

The above type of optical modulation device can have a large pixel capacity and effect a gradational display. However, the optical modulation device still involves several problems in respects of actual production and operation, such as a large number of electrodes, complicated connection with wires from a driving power supply and electrodes on substrates and fluctuation in display performances due to generation of Joule's heat by a current passing between the electrodes and change in potential gradient.

SUMMARY OF THE INVENTION

In view of the above, a principal object of the present invention is to provide an optical modulation device which can be produced easily and capable of providing a stable gradational display with high-density pixels.

According to the present invention, there is provided an optical modulation device, comprising: a first substrate having thereon a high-resistivity transparent conductor film and a plurality of low-resistivity conductor films disposed on the transparent conductor film and dividing the transparent conductor film into plural stripes; a second substrate having thereon a plurality of transparent conductor film stripes; and an optical modulation material interposed between the first and second substrates;

wherein said optical modulation device further includes a plurality of connecting conductors for connection with an external driver, the connecting conductors being disposed in a region free of the high-resistivity transparent conductor film of the first substrate and each connected to one of the low-resistivity conductor films.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 15 and 16 are schematic views for explaining an operation principle of a ferroelectric liquid crystal cell.

DETAILED DESCRIPTION OF THE PREFERRED EMBODIMENTS

Figure 3:
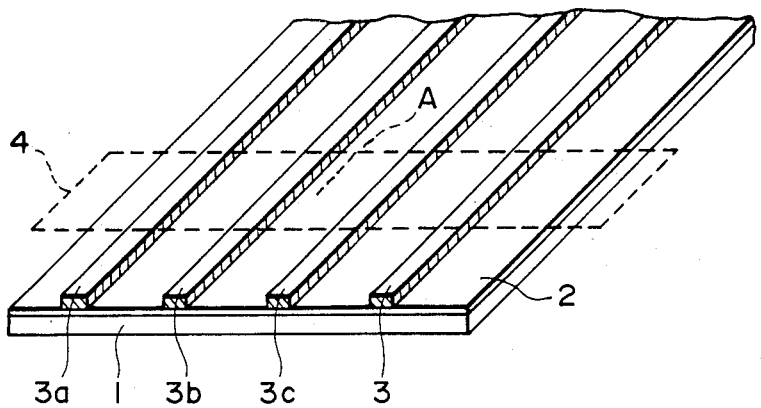
FIGS. 3 and 12 are partial perspective views showing a substrate structure.
Figure 4A:
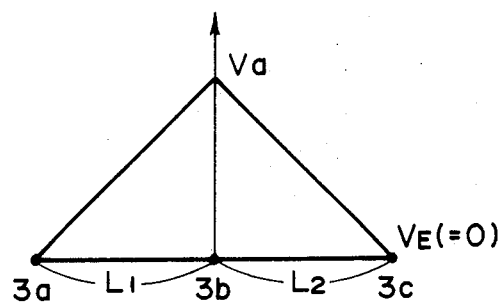
FIGS. 4A and 4B are explanatory views schematically showing a potential gradient.
Figure 4B:
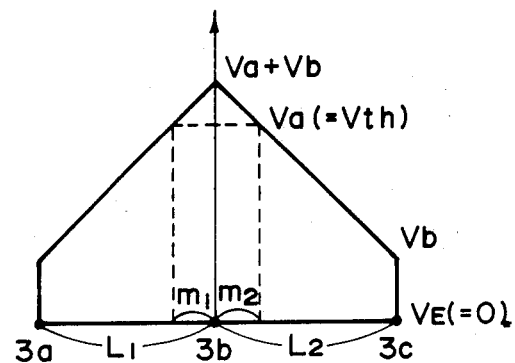

FIG. 3 is a partial perspective view of a substrate for a liquid crystal optical device constituting an embodiment of the optical modulation device according to the present invention.

Referring to FIG. 3, on one substrate 1 are disposed a display conductor film 2 and transmission electrodes 3 (3a, 3b, 3c, ...) of low resistive metal films which are laminated on the conductor film 2 in parallel with each other and with equal spacings. Opposite the substrate 1, the other substrate (not shown) is disposed having a counter conductor film (counter electrode) 4 thereon so as to intersect with the transmission electrodes 3 to define pixels, e.g., one denoted by A. The above mentioned optical modulation material is sandwiched between the display conductor film 2 and the counter electrode 4.

In the liquid crystal optical device constructed in the manner described above, a potential gradient may be provided along the conductor film by applying a scanning voltage to a transmission electrode 3, thereby to cause a voltage gradient in electric field between the display conductor film 2 and a counter electrode 4.

In this instance, when a transmission electrode 3b, for example, is supplied with a prescribed signal voltage Va and adjacent transmission electrodes 3a and 3c are supplied with a reference potential $V_E$ (e.g., 0 volt), a potential gradient of Va is provided in a length $L_1$ between the transmission electrodes 3b and 3a and in a length $L_2$ between 3b and 3c along the extension of the conductor film 2.

At this time, when the inversion threshold voltage Vth is assumed to be Va, and a signal of −Vb is applied to the counter electrode 4, a potential difference Va+Vb exceeding the inversion threshold voltage Vth is applied to the ferroelectric liquid crystal corresponding to lengths $m_1$ and $m_2$ along the extension of the conductor film 32, so that the region corresponding to the $m_1+m_2$ may be inverted, e.g., from the bright state to the dark state.

Accordingly, a gradation may be displayed by applying a value Vb of signal selected corresponding to given gradation data to individual pixels. In this instance, it is possible to modulate the magnitude of the voltage signal −Vb applied to the counter electrode 4 in the above described manner, alternatively to modulate the pulse duration thereof, or to modulate the number of pulses thereof, thereby to effect the control of the resultant gradation.

Next, a specific example of the structure of the above optical modulation device will be explained with reference to FIG. 3.

Referring to FIG. 3, a 2000 Å-thick transparent conductor film of $SnO_2$ (tin oxide) is formed by sputtering as a conductor film 2 on a glass substrate 1. Then, a 1000 Å-thick Al film is formed by vacuum evaporation on the $Sn_2$ film and then patterned to form a plurality of transmission electrodes 3 in the form of stripes. Alternatively, a uniform Al film may be formed by vacuum evaporation and then patterned to easily form a plurality of the transmission electrodes 3. For example, the transmission electrodes may be formed with a spacing of 230 μm and a width of 20 μm.

According to the above-described method, it is possible to omit a step for fine etching of the $SnO_2$ film and further a step for fine etching of the conductor film such as an ITO film. Alternatively, it is also possible to form a fine pattern of $SnO_2$ film or ITO film as desired. For example, it is possible to etch the $SnO_2$ film with a paste of zinc powder and water, optionally with dilute hydrochloric acid. Alternatively, it is possible to form a finer pattern of $SnO_2$ film by reacting $SnO_2$ with $BF_3$ (boron trifluoride) plasma to decompose the $SnO_2$.

On the other hand, counter electrodes 4 of ITO (indium tin oxide) film may be formed on a counter substrate by sputtering.

On each of the thus prepared two substrates, an about 500 Å-thick polyvinyl alcohol film is formed as a liquid crystal alignment film and subjected to a rubbing treatment.

Further, as another method of forming high-resistivity portions and low-resistivity portions alternately, it is possible to form a stripe pattern of Al film in a thickness of 500–1000 Å by vacuum evaporation through a mask or by vacuum evaporation of Al followed by patterning, and then uniformly form an $SnO_2$ film in a thickness of about 3000 Å over the Al film on the substrate 1.

As still another method, it is possible to first form a uniform film of $SnO_2$ on a substrate 1 and form locally therein low-resistivity portions by doping with a metal such as Al, e.g., by forming stripes of such a metal through a mask on the $SnO_2$ film followed by thermal diffusion or by plasma doping. After the doping, it is possible to smoothen the surface by abrasion or etching of the metal portion.

After forming the low-resistivity portions and the high-resistivity portions alternately in the above-described or other manners, a counter substrate is provided, an alignment film is formed, and an aligning treatment such as rubbing is effected.

In a preferred embodiment according to the present invention, the sheet resistivity (according to ASTM D 257) of the display conductor film 32 may preferably be on the order of $10^4$ Ω/□ (ohm per square) − $10^7$ $10^6$ /□ and may be on the order of $10^3$–$10^9$ Ω/□ as a tolerable range. An example of a film having such a resistivity may be an $SnO_2$ film as described above formed by sputtering in an argon stream containing oxygen. Such a method of sputtering in an argon stream is disclosed, for example, by D. B. Fraser and H. D. Cook, "Highly Conductive Transparent Films of Sputtered $In_2-xSn_xO_3-y$", Journal of the Electrochemical Society Solid-State Science and Technology, Vol. 119, No. 10 (published in 1972).

By adjusting the resistivity of the display conductor film 32 in the above described manner, the above described gradational display may be applicable to a wide variety of optical modulation materials, and moreover the power consumption can be minimized when a potential gradient is provided in the above mentioned manner.

The above condition is first of all effective to suppress the heat generation due to a current passing through the display electrode at the time of forming a potential gradient for gradational display.

More specifically, the temperature increase ΔT of the electrode may be calculated by the following equation as a simple theoretical calculation where a heat dissipation to the glass substrate, etc., is not considered:

$$T(°K.) = \frac{(V^2/R)(W) \times t(sec)}{C(J/cm^3 \cdot °K.) \times v(cm^3)},$$

wherein the respective symbols denote the following:
V: Va−VE (potential difference between transmission electrodes),
R: resistance between transmission electrodes,
t: application period for the above V,
C: heat capacity of a display electrode (between transmission electrodes), and
v: volume of the display electrodes between transmission electrodes Herein, when one pixel is noted, and if V is, e.g., 10 volts, t is 100 μsec., C is 2–3 J/cm³·°K., z and v is 230 μm×230 μm×3000 Å as exemplified above, then ΔT is calculated to be on the order of 250000/R (°K.). Even if the heat dissipation or conduction to the glass substrate, etc., is considered here, if the R (equal to the sheet resistivity as described above) is on the order of several Ω to several tens of Ω, the temperature increase amounts to a considerable value. It is possible that the temperature increase exerts an ill effect on the optical or physical properties of an optical modulation material disposed in the neighborhood. Especially, the effect is further pronounced when the voltage is increased, the writing period for a pixel in increased, or even if the writing period becomes shorter, the pixel area is decreased further. Moreover, in a case where the voltage V is 10 volts, if R is 100 Ω for example, then the power consumption per pixel becomes 1 W, which amounts to a large value of 1 KW when a large number of such pixels are arranged in a matrix and, e.g., 1000 pixels are provided with a gradation at a time. In this instance, it is possible to solve the above problem by setting the sheet resistivity of the display electrode to above $10^3$ Ω/□. Further, in order to alleviate the above effect due to temperature increase, to make possible the selection of an optical modulation material from a wide scope and to smoothly reduce the writing period and pixel area, the sheet resistivity of $10^4$ Ω/□ or more may preferably be selected.

The upper limit of the sheet resistivity may preferably be on the order of $10^9$ Ω/□ or below, further preferably on the order of $10^7$ Ω/□ or below. The reason for this may be considered as follows. If the dielectric constant of an optical modulation material used is assumed to be about 5, a typical value for a ferroelectric liquid crystal, the layer thickness thereof be 1 μm, and the pixel area be 230 μm square, then the capacitance of the liquid crystal layer becomes about 2.5 pF ($2.5 \times 10^{-12}$F) per pixel. Here, if it is required to drive the above liquid crystal for example in 100 μsec., it is preferred that the product CR of the resistance R of the display electrode and the capacitance C of the liquid crystal layer be sufficiently below the above mentioned 100 μsec. More specifically, when the above values are taken as typical, if R=$10^7$ Ω/□, it becomes $2.5 \times 10^{-5}$ sec (25 μsec), so that optimization is possible if a lower R is used. However, if a slower driving is possible (e.g., 1 msec-10 msec) or a thicker liquid crystal layer providing a smaller capacitance is possible, then a resistivity on the order of $10^9$ Ω/□ or even larger may be acceptable. Here, the sheet resistivity values (Ω/□) used herein and based on measurement according to ASTM D-257.

Figure 1A:
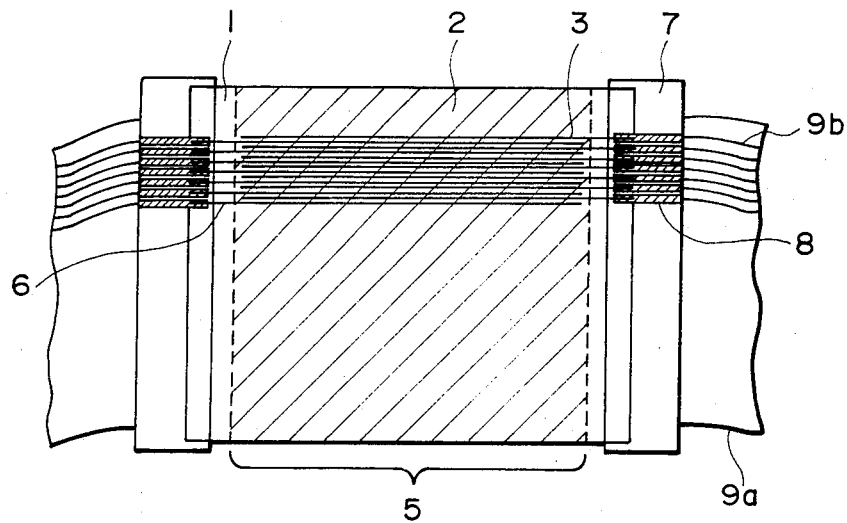
FIGS. 1A and 1B are a plan view and a sectional view showing an electrode structure on a substrate.
Figure 1B:
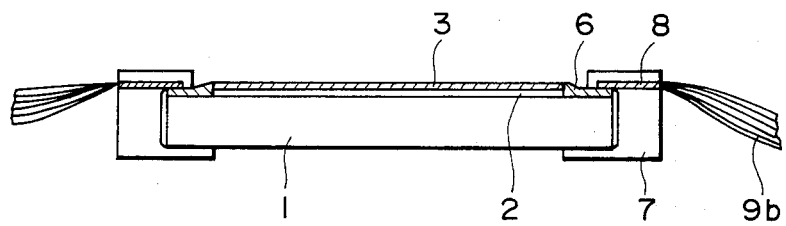

FIGS. 1A (plan view) and 1B (sectional view) show a structure or arrangement of electrodes on a substrate. Referring to FIGS. 1A and 1B, transmission electrodes 3 are disposed in parallel with each other and with equal spacings on a high-resistivity transparent conductor film 2, whereby a resistive film region 5 is formed. Every other transmission electrode 3 extends its end so as to form an electrode extension 6. The electrode extension 6 is formed integrally with a transmission electrode 3 and on the same substrate as the transmission electrode 3 and is connected to a connector 7 for connection with wires from an external drive (not shown). The connector 7 has connecting conductors 8 to which driving voltages are supplied from the external driver through cables 9b formed on a flexible substrate 9a.

Hereinbelow, the operation of the electrode structure shown in FIGS. 1A and 1B will be explained also with reference to FIG. 2 which is an enlarged view of the side portions of the substrate shown in FIG. 1A. According to the present invention, the width of a connecting conductor 8 of the connector 7 can be enlarged, whereby the difficulty in providing the substrate 1 with the connector is remarkably alleviated. More specifically, a spacing or gap b between connecting conductors 8a and 8b adjacent to each other is free of a resistive film (extended portion of the high-resistivity conductor film 2), so that the spacing b can be smaller than a spacing a between the transmission electrodes 3. For example, if a resistive film from the conductor film 2 is extended up to the spacing b, a current is liable to flow between the connecting conductors 8a and 8b to generate a Joule's heat, and also a potential gradient along the spacing a between the transmission electrodes is decreased. According to the above-described structure, the generation of a Joule's heat and the change in potential gradient are prevented. Particularly, no current flows along a spacing c shown in FIG. 2 even if the connector 7 is disposed close to the optical modulation region in order to provide a compact device as a whole, so that good performances are attained equally.

Further, even if the connector 7 is connected to the substrate 1 with some deviation, the connection with prescribed transmission electrode can be secured because each connecting conductor may have a sufficiently large width. As a result, the efficiency of device production can be improved.

Figure 2:
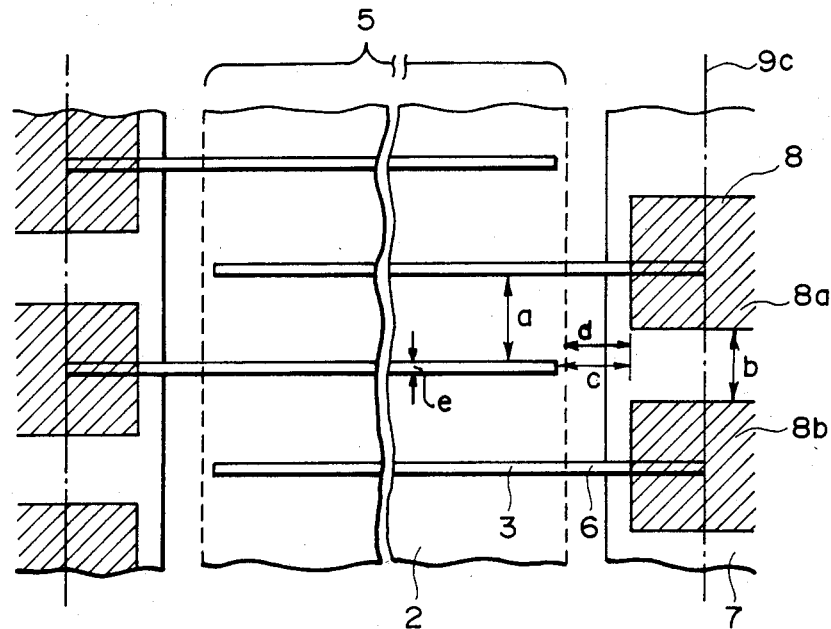
FIG. 2 is an enlarged partial view of the side portions of a substrate.

In a preferred embodiment, the respective parameters shown in FIG. 2 are taken in the following ranges: a: 50–500 μm, b: 10–50 μm, 50 μm or longer, preferably 100 μm or longer; d (distance between the high-resistivity conductor film 2 and a connecting conductor 8): 20 μm or longer, preferably 50 μm or longer; e (width of a transmission electrode): from 1/20 to ¼ of a; and the difference c−d: 10 μm or longer.

The above-described resistive film-free region, where the liquid crystals 8 are disposed, may be relatively easily formed, e.g., by masking the regions on both sides of the substrate 1 for connection with the connectors 7 when the high-resistivity transparent conductor film 2 is formed, e.g., by sputtering.

Hereinabove, the optimum resistivity ranges for the high-resistivity conductor film 2 have been explained. On the other hand, the transmission electrodes 3 have a function of transferring a voltage from the connection to the display electrode (high-resistivity conductor film), so that those having a sufficiently low resistivity, e.g., around 1 Ω/□ or lower may be used therefor. Further, the counter electrode 4 may for example be composed of an ITO film having a sheet resistivity of around 20 Ω/□ and may be used as described above.

As a specific example of practice, two substrates prepared in the above described manner were disposed opposite to each other with a spacing of about 1 m to form a cell, into which a ferroelectric liquid crystal (a composition consisting mainly of p-n-octyloxybenzoic acid-p'-(2-methylbutyloxy)phenylester and p-n-nonyloxybenzoic acid-p'-(2-methylbutyloxy) phenylester) was injected. The size of the pixel A constituted by a superposed portion of a display conductor film 2 and a counter electrode 4 was made 230 μm×230 μm, where the width of the pixel A was made $L_1/2+L_2/2$.

On both sides of the liquid crystal cell thus prepared, a pair of polarizers were disposed in the form of cross nicols, and the optical characteristics were observed.

Figure 5:
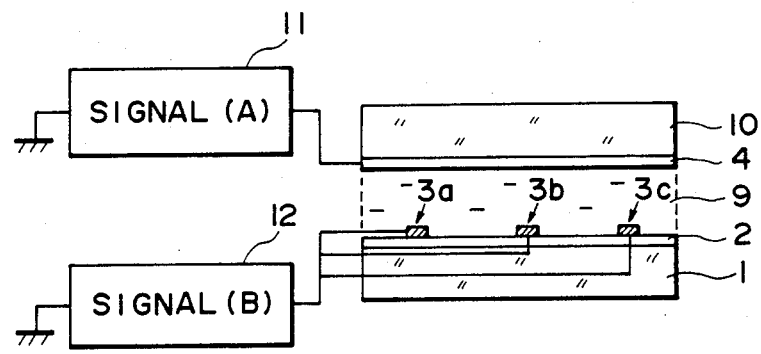
FIG. 5 is a schematic view for illustrating electric signals.

FIG. 5 schematically illustrates a method of applying electric signals to a liquid crystal cell which includes a substrate 1, a display conductor film 2, transmission electrodes 3a, 3b and 3c, a counter conductor film 4 disposed or a counter substrate 10, and a ferroelectric liquid crystal 9 sandwiched between the two substrates. The counter conductor film 4 is connected to a first driven circuit 11, and the display conductor film 2 is connected to a second driver circuit.

Figure 6:
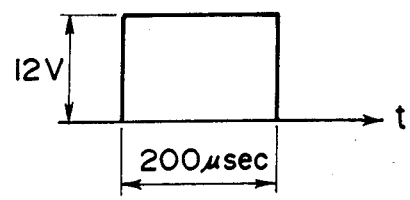
FIG. 6, FIGS. 7A–7E, FIGS. 9A–9E, FIG. 10 and FIGS. 11A–11E are explanatory views showing pulse waveforms.

FIGS. 6 and 7 show electric signals applied to the liquid crystal cell. More specifically, FIG. 6 shows a waveform of SIGNAL(A) generated by the driver circuit 11 shown in FIG. 5, and Figures 7A-7E show waveforms of SIGNAL(B) generated by the driver circuit 12 shown in FIG. 5.

Now, a 200 μsec-pulse of −12 V is applied as a signal(B) to all the transmission electrodes $3a$, $3b$, $3c$, . . . , and a 200 μsec-pulse of 8 V (called "erasure pulse") is preliminarily applied in phase with a counter electrode 4 in an erasure step. Then, the liquid crystal 9 is switched to the first stable state to provide a pixel A (FIG. 3) wholly with a bright state (as a pair of polarizers are arranged in cross nicols in such a manner). Incidentally, for convenience of explanation, the liquid crystal used herein is assumed to have a switching or inversion threshold of ±15 V-±16 V.

From this state, in phase with the pulse shown in FIG. 6 applied to the transmission electrode $3b$ as a signal(B) while the transmission electrodes $3a$ and $3c$ are placed at a reference potential (0 in this example), various pulses as shown in FIGS. 7A-7E are respectively applied to the pixel A. The resultant optical states of the pixel A are shown in FIGS. 8A-8D.

Figure 7A:
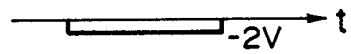
Figure 7B:
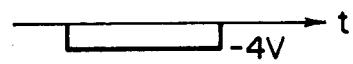
Figure 7C:
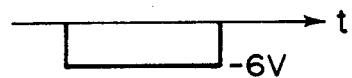
Figure 7D:
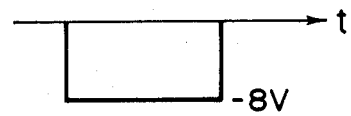
Figure 7E:
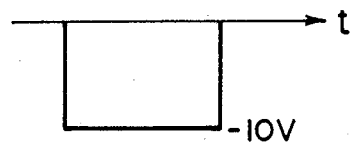
Figure 8A:
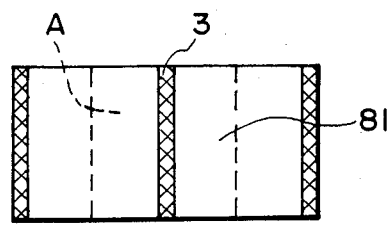
FIGS. 8A–8D are schematic views showing gradational display states of a pixel.
Figure 8B:
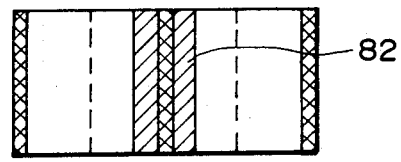
Figure 8C:
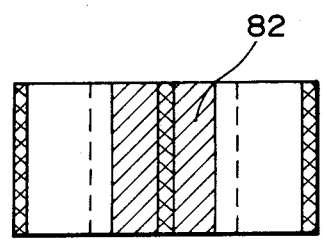
Figure 8D:
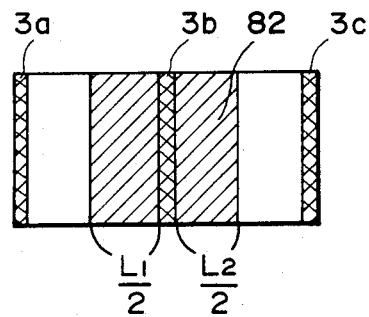
Figure 9A:
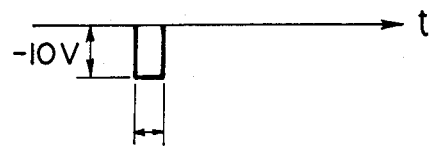
Figure 9B:
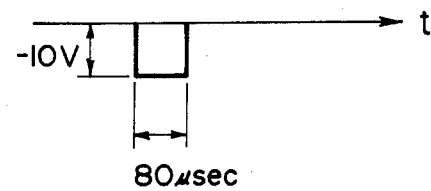
Figure 9C:
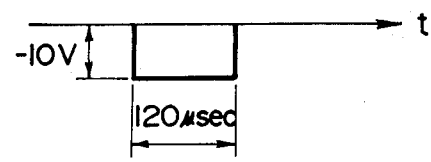
Figure 9D:
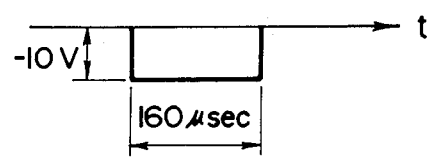
Figure 9E:
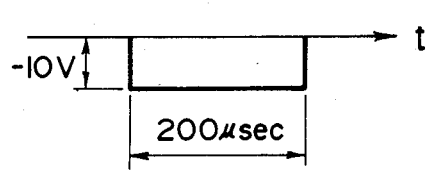

More specifically, when the pulse voltage applied to the counter electrode is −2 V as shown in FIG. 7A, no change at all occurs from the bright state 81 as shown in FIG. 8A. When a pulse voltage of −4 V as shown in FIG. 7B is applied, a portion of the liquid crystal in a close proximity of the transmission electrode $3b$ is switched to a dark state 82 as shown in FIG. 8B because of an electric field exceeding the threshold of the liquid crystal. When the applied voltage is further increased to −6 V (FIG. 7C) or −8 V (FIG. 7D), the dark state area 82 is enlarged as representatively shown in FIG. 8C because the area of exceeding the switching threshold 10 is enlarged. When the applied voltage is −10 V (FIG. 7E), the pixel A is wholly changed to the dark state as shown in FIG. 8D. In this way, a gradational image may be formed.

Figure 10:
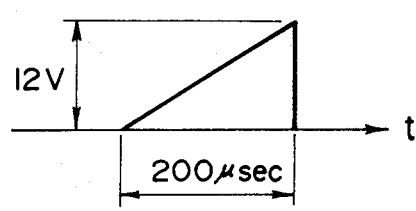
Figure 11A:
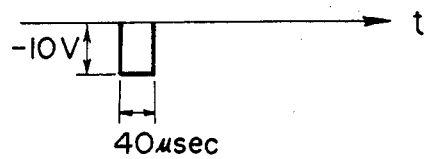
Figure 11B:
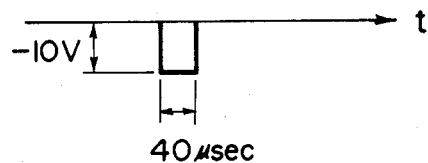
Figure 11C:
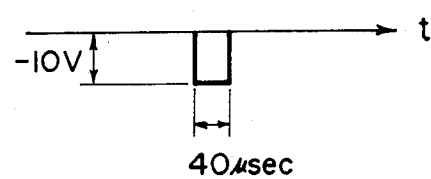
Figure 11D:
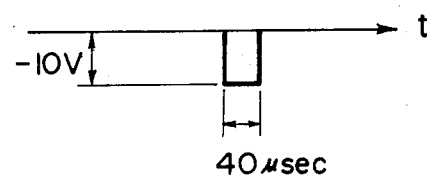
Figure 11E:
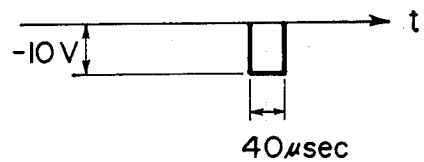

The optical state changes as shown in Figures 8A-8D may also be obtained when various pulses (A) with different pulse durations as shown in Figures 9A-9E are applied in phase with a triangular wave signal (B) as shown in FIG. 10. More specifically, in this instance, a gradational display may be effected by applying the signal shown in FIG. 10 to the transmission electrode $3b$ while applying the pulses shown in FIGS. 9A-9E to the counter electrode 4 corresponding to given gradation data in phase with the signal applied to the transmission electrode $3b$.

Further, it would be readily understood that a similar effect is obtained by applying various pulses of different phases as shown in FIGS. 11A-11E as signals (B) in synchronism with the triangular wave signal (A) shown in FIG. 10.

In the present invention, it is preferred that the signal (A) or (B) supplied from the driver circuit 11 or 12 has a high frequency of, e.g., 1 kHz or higher because the generation of Joule's heat is suppressed by using a high-frequency driving voltage.

In this invention, the transmission electrodes $3a$, $3b$, . . . may be composed of a metal such as silver, copper, gold or chromium, or a transparent electrode such as low-resistivity ITO instead of aluminum (Al) used in the above example. The sheet resistivity may preferably be $10^2$ Ω/□ or below. The sheet resistivity of the electrodes may be adjusted to an appropriate value, for example, by controlling the film thickness.

In the above, a method of providing a gradation has been explained. However, it is of course possible to provide a two-value display without expressing a gradation by particularly selecting two signal levels. In this case, the signal shown in FIG. 7E, or FIG. 9E may be used as an inversion signal.

Figure 12:
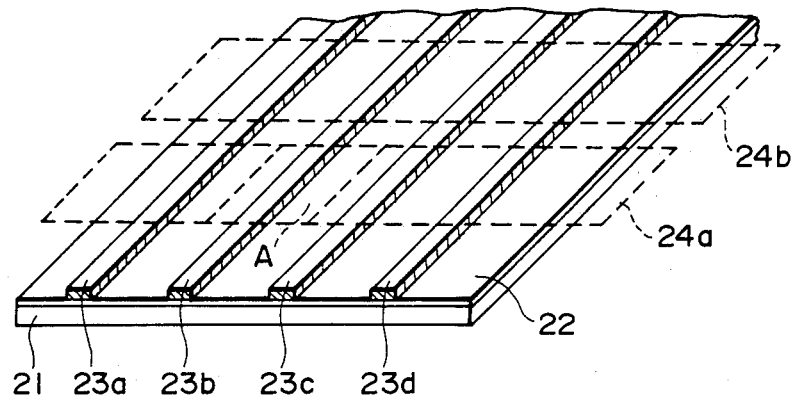

FIG. 12 is a partial schematic view of a specific embodiment of a liquid crystal panel adapted to application of the gradational display system to matrix or multiplex driving.

The display panel shown in FIG. 12 comprises a conductor film 22 disposed on a glass substrate 21, and transmission electrodes 23 ($23a$, $23b$, $23c$, . . . ) of a low-resistivity disposed on the conductor film 22. Opposite the substrate 21, there is disposed a counter substrate (not shown) on which counter electrodes 24 ($24a$, $24b$, . . . ) are disposed. Further, a ferroelectric liquid crystal is disposed between the conductor film 22 and the counter electrodes 24.

In this embodiment, prior to writing, all the transmission electrodes 23 may be placed at the same potential level so as to apply a uniform electric field across the whole or a prescribed part of the pixels formed at the intersections of the stripe conductor films 22 and the stripe counter electrodes 24, thereby to bring the whole or the prescribed part of the pixels to either one of the bright and dark states at a time; or prior to writing for each writing line, the whole or a prescribed part of the pixels on the writing line are brought to either one of the bright and dark states. Then, a pulse as shown in FIG. 6 or 9 is sequentially applied as a scanning signal to each transmission electrode while the other transmission electrodes are placed at a reference potential level (e.g., 0 volt), whereby a potential gradient is sequentially provided to the stripe conductor films 22 between the selected transmission electrode 23 (e.g., $23b$) and the adjacent transmission electrodes 23 (e.g., $23a$ and $23c$). In this instance, the scanning selection signal is preferably be made a voltage pulse equal to or somewhat lower than the inversion threshold voltage of the ferroelectric liquid crystal.

Figure 13:
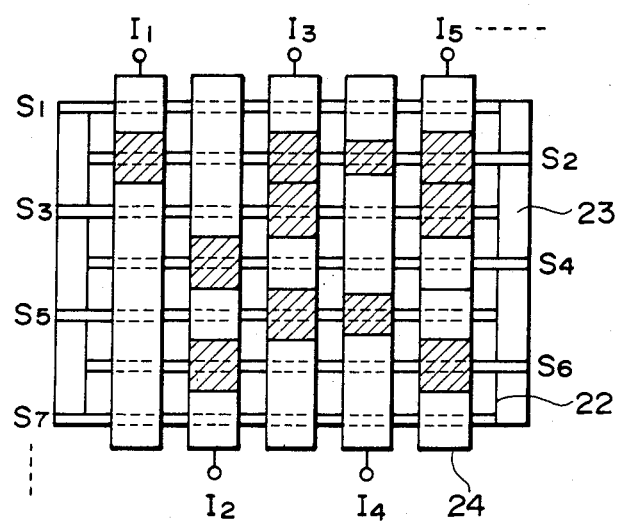
FIG. 13 is an explanatory view schematically showing a display state of a picture.

On the other hand, voltage signals as shown in FIGS. 7A-7E or FIGS. 9A-9E corresponding to give gradation data are applied to respective stripe counter electrodes 24 in phase with the scanning selection signal applied to the transmission electrodes 23, whereby the pixels on a scanned line are written into a gradational state. By conducting the above writing operation line-sequentially, one picture frame with gradation can be formed as shown in FIG. 13.

In this instance, it is also possible that the above-mentioned scanning signal is first applied to odd-numbered terminals $S_1$, $S_3$, $S_5$, . . . $S_{2n-1}$ sequentially and then applied to even-numbered terminals $S_2$, $S_4$, $S_6$, . . . $S_{2n}$ sequentially.

In the above, the reference potential $V_E$ has been generally explained to be zero potential but can be raised to have a positive value. In this case, the difference $V_a - V_E$ becomes smaller to result in a smaller potential gradient for providing a gradation, but the absolute value of an information signal can be decreased. On the other hand, it is also possible to lower the reference potential, so that the value $V_a - V_E$ is increased to broaden the gradation range.

In the optical modulation device according to the present invention, it is also possible to effect a gradational display over the entire frame by sequentially applying a scanning signal to the abovementioned stripe counter electrodes 24, applying gradation signals to odd-numbered (or even-numbered) transmission electrodes in phase with the scanning signal while connecting the even-numbered (or odd-numbered) transmission electrodes to the reference potential point, and then applying gradation signals to even-numbered (or odd-numbered) transmission electrodes while connecting the odd-numbered (or even-numbered) transmission electrodes to the reference potential point.

In this instance, however, when a potential gradient is provided between transmission electrodes for supplying information signals and a case of driving a picture frame with, e.g., 1000×1000 pixels is considered, a power consumed in display electrodes between transmission electrodes for supplying information signals amounts to those required at pixels in a number of 1000× (the number of selected pixels). As a result, the power consumed becomes considerable unless the display electrodes have an appropriately low resistivity. Accordingly, it is most preferable to provide a potential gradient between transmission electrodes for supplying a scanning signal.

Figure 14:
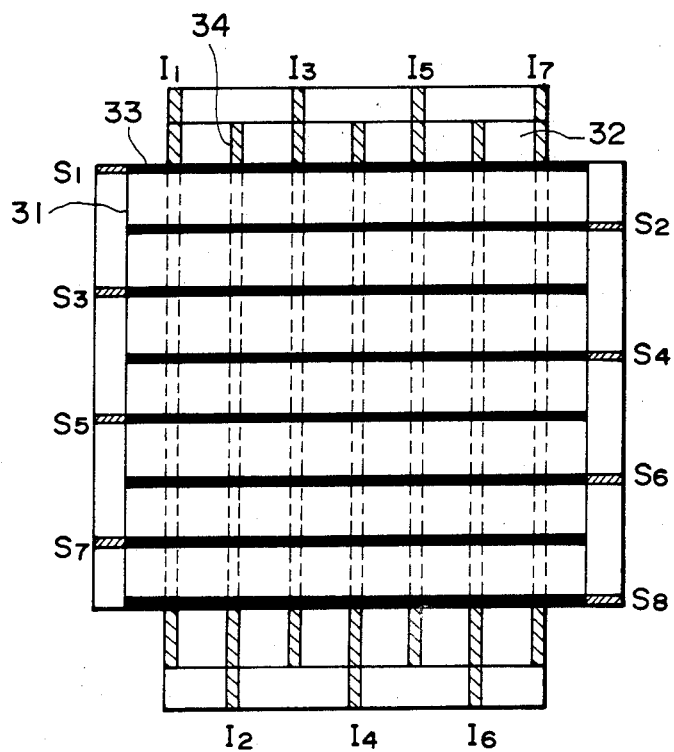
FIG. 14 is a schematic plan view showing another electrode structure.

FIG. 14 shows another embodiment of the present invention. In the liquid crystal optical device shown in FIG. 14, a conductor film 31 is formed on one substrate and a plurality of low-resistivity transmission electrodes 33 are formed thereon so as to define the conductor film 31 into stripes. On the other substrate, a conductor film 32 is disposed opposite the conductor film 31 by the medium of a ferroelectric liquid crystal (not shown). A plurality of low-resistivity transmission electrodes are formed on the conductor film 32 so as to define the conductor film 32 into stripes which intersect with the stripes of the conductor film 31.

In this embodiment, the respective terminals $S_1, S_2, \ldots S_7$ of the transmission electrodes 33 are connected to a scanning signal generator circuit (not shown), and the respective terminals $I_1, I_2, \ldots I_6$ of the transmission electrodes 34 are connected to an information signal generator circuit (not shown). Accordingly, each pixel after the erasure step can be provided with a potential gradient along the scanning signal side conductor film and a potential gradient also along the information signal side conductor film, so that potential gradients generated on both sides are applied to the ferroelectric liquid crystal in a pixel. As a result, a gradational display with more gradation levels can be provided.

As an optical modulation material used in the driving method according to the present invention, a material which shows a first optically stable state (e.g., assumed to form a "bright" state) and a second optically stable state (e.g., assumed to form a "dark" state) depending on an electric field applied thereto, i.e., one showing at least two stable states in response to an electric field, particularly a liquid crystal showing such a property, may be used.

Preferable ferroelectric liquid crystals showing at least two stable states, particularly bistability, which can be used in the driving method according to the present invention are chiral smectic liquid crystals having ferroelectricity, among which liquid crystals showing chiral smectic C phase (SmC*), H phase (SmH*), I phase (SmI*), F phase (SmF*) or G phase (SmG*) are suitable. These ferroelectric liquid crystals are described in, e.g., "LE JOURNAL DE PHYSIQUE LETTRE" 36 (L-69), 1975 "Ferroelectric Liquid Crystals": "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-O-(2-methyl)-butylresorcylidene-4'-octylaniline (MBRA 8), etc.

When a device is constituted using these materials, the device may be supported with a block of copper, etc., in which a heater is embedded in order to realize a temperature condition where the liquid crystal compounds assume an SmC*, SmH*, SmI*, SmF* or SmG* phase.

Referring to FIG. 15, there is schematically shown an example of a ferroelectric liquid crystal cell for explanation of the operation thereof.

Reference numerals 101a and 101b denote substrates (glass plates) on which a transparent electrode of, e.g., $In_2O_3$, $SnO_2$, ITO (Intium-Tin-Oxide), etc., is disposed, respectively. A liquid crystal of, e.g., an SmC*-phase in which liquid crystal molecular layers 102 are oriented perpendicular to surfaces of the glass plates is hermetically disposed therebetween. Full lines 103 show liquid crystal molecules. Each liquid crystal molecule 103 has a dipole moment ($P_\perp$) 104 in a direction perpendicular to the axis thereof. When a voltage higher than a certain threshold level is applied between electrodes formed on the base plates 101a and 101b, a helical structure of the liquid crystal molecule 103 is unwound or released to change the alignment direction of respective liquid crystal molecules 103 so that the dipole moment ($P_\perp$) 104 are all directed in the direction of the electric field. The liquid crystal molecules 103 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell (the thickness of the ferroelectric liquid crystal layer) is sufficiently thin (e.g., $1\mu$), the helical structure of the liquid crystal molecules is unwound to provide a non-helical structure even in the absence of an electric field whereby the dipole moment assumes either of the two states, i.e., Pa in an upper direction 114a or Pb in a lower direction 114b as shown in FIG. 16. When electric field Ea or Eb higher than a certain threshold level and different from each other in polarity as shown in FIG. 16 is applied to a cell having the abovementioned characteristics, the dipole moment is directed either in the upper direction 114a or in the lower direction 114b depending on the vector of the electric field Ea or Eb. In correspondence with this, the liquid crystal molecules are oriented in either of a first stable state 113a (bright state) and a second stable state 113b (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 16. When the electric field Ea is applied to the liquid crystal molecules, they are oriented to the first stable state 113a. This state is stably retained even if the electric field is removed. On the other hand, when the electric field Eb of which the direction is opposite to that of the electric field Ea is applied thereto, the liquid crystal molecules are oriented to the second stable state 113b, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

In the above, the present invention has been explained with reference to a device using a ferroelectric liquid crystal, particularly a ferroelectric liquid crystal having at least two stable states, as a most preferable example, whereas the present invention may also be applied to another liquid crystal such as a twisted-nematic liquid crystal or a guest-host liquid crystal or further to an optical modulation material other than a liquid crystal.

As described above, according to the present invention, the generation of Joule's heat and the change of potential gradient are effectively prevented by preventing a current flow between individual connecting wires and between the connecting wires and the transmission electrodes, whereby fluctuation in display characteristics is removed and a more stable gradational display can be effected.

What is claimed is:

1. An optical modulation device, comprising: a first substrate having thereon a continuous high-resistivity transparent conductor film and a plurality of low-resistivity conductor films disposed on the transparent conductor film and dividing the transparent conductor film such that they appear as adjacent and parallel plural stripes; a second substrate having thereon a plurality of transparent conductor film stripes; and an optical modulation material interposed between the first and second substrates;

wherein said optical modulation device further includes a plurality of connecting conductors for connection with an external driver, the connecting conductors being disposed in a region free of the high-resistivity transparent conductor film of the first substrate and each connected to one of the low-resistivity conductor films.

2. An optical modulation device according to claim 1, wherein each connecting conductor is connected to one of the low-resistivity conductor films through the extended portion of the low-resistivity conductor film, and the extended portion is also disposed in the region free of the high-resistivity transparent conductor film of the first substrate.

3. An optical modulation device according to claim 1, wherein the transparent conductor film stripes on the first substrate and the plurality of transparent conductor film stripes on the second substrate intersect each other.

4. An optical modulation device according to claim 1, wherein said high-resistivity conductor film on the first substrate comprises a film of $SnO_2$.

5. An optical modulation device according to claim 1, wherein said low-resistivity conductor films comprise a metal or its alloy.

6. An optical modulation device according to claim 1, wherein said optical modulation material comprises a ferroelectric liquid crystal.

7. An optical modulation device according to claim 1, wherein said optical modulation material comprises a chiral smectic liquid crystal.

8. An optical modulation device according to claim 1, wherein said external driver comprises means for supplying a high frequency driving voltage.

* * * * *

UNITED STATES PATENT AND TRADEMARK OFFICE
CERTIFICATE OF CORRECTION

PATENT NO. : 4,815,823
DATED : March 28, 1989
INVENTOR(S) : SHUZO KANEKO

It is certified that error appears in the above-identified patent and that said Letters Patent is hereby corrected as shown below:

On the title page:

IN [54] TITLE

"PLURAL" should be deleted.

COLUMN 1

Line 1, "PLURAL" should be deleted.
    Line 31, "]" should be deleted.

COLUMN 4

Line 25, "$-10^7 106/\square$" should read $--10^7 \Omega/\square--$.
    Line 33, "$In_2-xSn_xO_{3-y}$", " should read $--In_2-xSn_xO_{3-y}$",--.
    Line 66, "z" should be deleted.

COLUMN 5

Line 6, "." should be deleted.
    Line 10, "in" should read --is--.
    Line 47, "and" should read --are--.

COLUMN 6

Line 29, "50µm" should read --c: 50µm--.

COLUMN 7

Line 1, "or" should read --on--.

UNITED STATES PATENT AND TRADEMARK OFFICE
CERTIFICATE OF CORRECTION

PATENT NO. : 4,815,823

DATED : March 28, 1989

INVENTOR(S) : SHUZO KANEKO

Page 2 of 2

It is certified that error appears in the above-identified patent and that said Letters Patent is hereby corrected as shown below:

COLUMN 8

Line 45, "be" should be deleted.

COLUMN 10

Line 25, Close up right margin.
    Line 26, Close up left margin.
    Line 28, "(Intium-Tin-Oxide)," should read --(Indium-Tin-Oxide),--.

Signed and Sealed this

Twenty-fourth Day of April, 1990

Attest:

HARRY F. MANBECK, JR.

*Attesting Officer*

*Commissioner of Patents and Trademarks*